Jan. 6, 1953  F. G. PATTERSON  2,624,875
PULSE ECHO SYSTEM WITH TIME SENSITIVITY CONTROL
Filed Oct. 26, 1948  2 SHEETS—SHEET 1
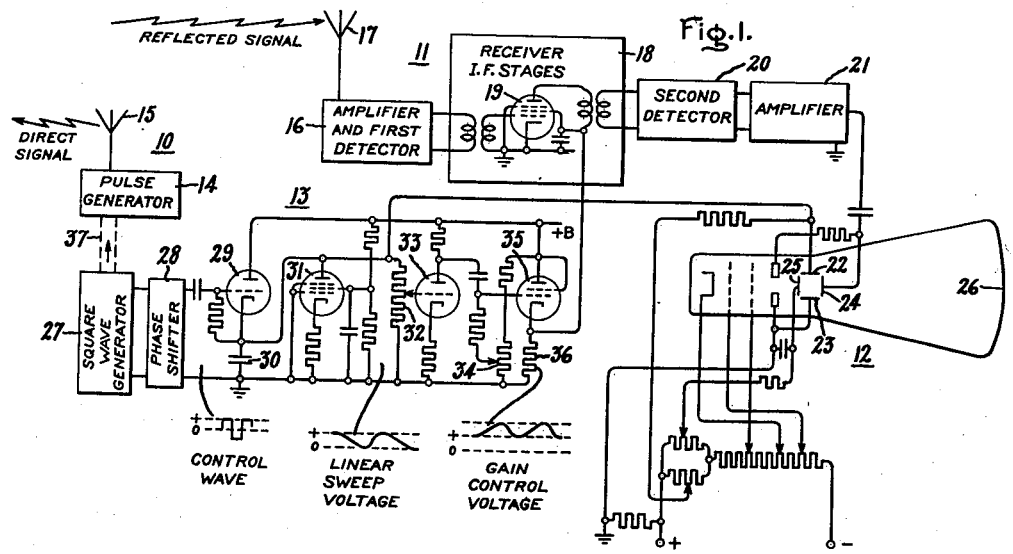
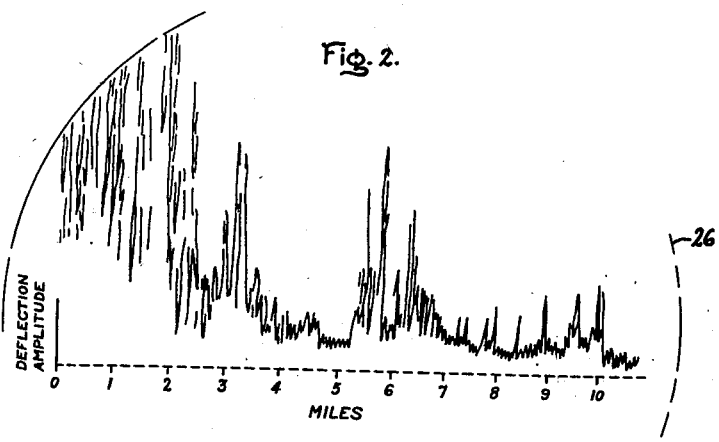
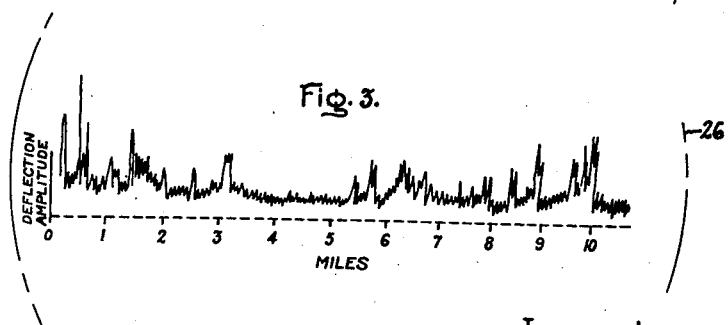
Inventor:
Franklin G. Patterson,
by Merton D. Moore
His Attorney.

Jan. 6, 1953     F. G. PATTERSON     2,624,875
PULSE ECHO SYSTEM WITH TIME SENSITIVITY CONTROL
Filed Oct. 26, 1948     2 SHEETS—SHEET 2
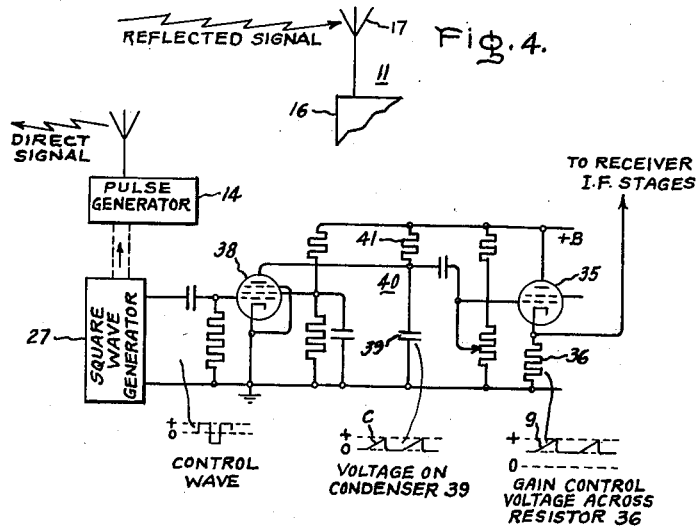
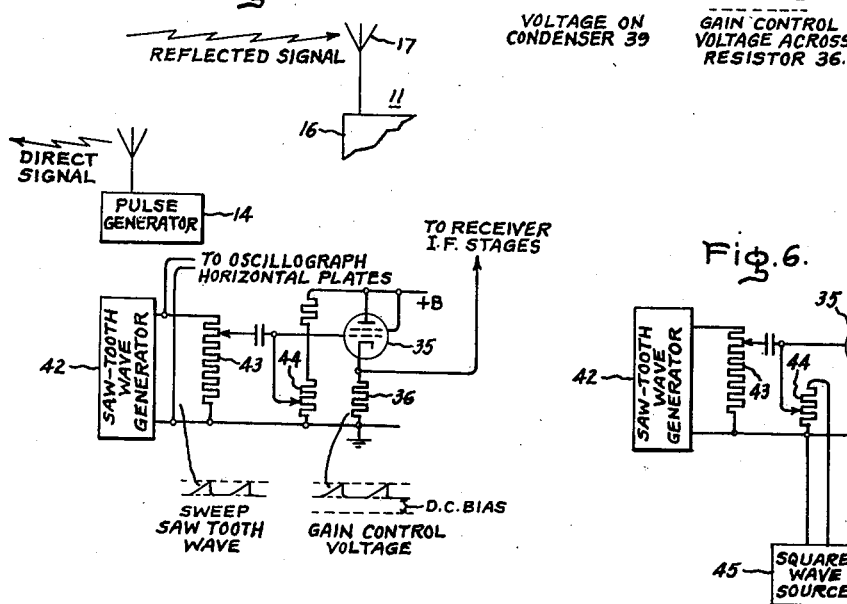
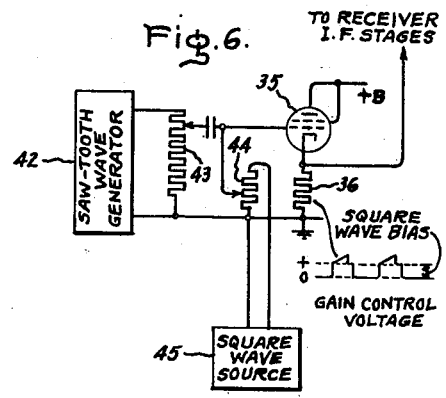
Inventor:
Franklin G. Patterson,
by *Merton D. Merrin*
His Attorney.

Patented Jan. 6, 1953

2,624,875

UNITED STATES PATENT OFFICE 2,624,875

PULSE ECHO SYSTEM WITH TIME SENSITIVITY CONTROL

Franklin G. Patterson, Schenectady, N. Y., assignor to General Electric Company, a corporation of New York Application October 26, 1948, Serial No. 56,537

9 Claims. (Cl. 343—13)

My present application is a continuation in part of my now abandoned application Serial No. 449,390, filed July 2, 1942, entitled "Range Determining System," which application was assigned to the assignee of my present application.

My invention relates to systems for determining the range of objects or targets by signal pulses emanating or reflected from the objects or targets upon impingement thereon of direct pulses which are projected from a high intensity pulse source. The invention relates particularly to such systems wherein the ranges of the plurality of objects at varying distances from the receiving apparatus are indicated by deflections produced in a sweep trace formed on a cathode ray oscillograph screen at each pulse period.

The primary object of the invention is to provide an improved system of this character insuring clearer and more easily detectable and usable indications of the ranges of the plurality of targets.

In systems of the general type above mentioned as usually employed heretofore the sweep trace on the oscillograph is initiated simultaneously with the starting or triggering of the direct short-period pulses which are projected to the targets whose ranges are to be determined and which direct pulses cause the initiation of the secondary pulses emanating in succession from the targets. The received pulses produce along the sweep trace of the oscillograph corresponding deflections therein indicating the ranges of the different targets simultaneously to the eye of the observer. The reflections or emanations from objects at a short distance from the receiver are usually relatively strong and the average strength of the received reflections decreases with distance. When it is desired that the range of objects or targets at a particular distance be determined it is therefore necessary so to adjust the gain of the receiver that the sweep trace deflections for this particular range are of suitable amplitude. However, when the receiver is thus adjusted for a particular range the usual result is that only a portion of the trace on the oscillograph screen is usable. For example, if the proper receiver gain adjustment be made for suitable deflection amplitudes at midscale range, then the deflections corresponding to nearby objects are of such extreme amplitude as to be off scale on the oscillograph screen because of the greater strength of the reflected pulses from these nearby objects, and no detail of the range indications therefor will be discernible. At the same time the deflections corresponding to objects farther away than those whose ranges are indicated at midscale will frequently be so small as to be invisible at the gain setting employed for the midscale indications.

It is a particular object of the present invention to overcome the foregoing difficulty and in particular to cause the indications of the pulse echoes or reflections to stand out on the sweep trace of the oscillograph in their true proportion corresponding to the distance of the objects and the initial strength of the return pulses emanating from them.

It is a further object to cause the indications of the pulse echoes or reflections corresponding to objects or targets even at the relatively distant ranges to stand out, if desired, in relatively greater proportion than the indications of echoes from targets nearer by.

In accordance with my present invention, to overcome the above described difficulty the sensitivity of the receiving apparatus is caused to be increased with time, immediately following the initiation of the main or direct pulse which is projected to the targets.

In range determining systems employed heretofore utilizing deflections in an oscillograph sweep trace to indicate the target ranges simultaneously, the receiving apparatus sensitivity has commonly been controlled in accordance with a square wave operating to bring the receiver to full sensitivity immediately upon the initiation of the main or direct pulse, and holding the receiver at the full sensitivity for the duration of the sweep. In accordance with my present invention, however, the receiver sensitivity is increased at a desired rate, or according to different desired laws, for the duration of the sweep by controlling the receiver sensitivity in accordance with a sawtooth wave which increases in amplitude with time. The sawtooth wave for producing the change in receiver sensitivity is so synchronized with the projected direct pulse that the initial or low amplitude portion of the wave is substantially coincident with the instant that the direct pulse is radiated and the amplitude of the wave increases thereafter during the sweep period.

The novel features which are considered to be characteristic of my invention are set forth with particularity in the appended claims. My invention itself, however, both as to its organization and method of operation together with further objects and advantages thereof, may best be understood from the following description taken in connection with the accompanying drawings wherein Fig. 1 is a diagrammatic representation of a range determining system embodying my invention; Figs. 2 and 3 are representations of oscillograph sweep traces illustrating the operation of my invention; Fig. 4 illustrates a different method of generating the sawtooth wave; and Figs. 5 and 6 illustrate range determining systems utilizing a sawtooth wave already present for other purposes.

In Fig. 1 the system shown therein for the determination of target ranges is constituted by a pulse generating apparatus 10, a pulse receiving apparatus 11, an oscillographic range indicating apparatus 12, and a control wave generating apparatus 13.

The apparatus 10 may comprise a pulse transmitter, designated by the rectangle 14, of any usual form adapted to radiate from an antenna 15 a train of suitable high-intensity short-period pulses to targets or objects (not shown) at different distances within a predetermined range.

The receiving apparatus 11 may comprise an amplifier and detector stage 16 connected to an antenna 17 adapted to have impressed thereon pulses emanating from the targets or objects, an intermediate frequency amplifier 18 of any desired number of stages such as represented by the electron discharge device 19, a second detector 20, and a video amplifier 21.

The oscillographic apparatus 12 may be of any suitable form having horizontal deflecting plates shown diagrammatically as 22 and 23, vertical deflecting plates 24 and 25, and screen 26. The output circuit of the video amplifier 21 of receiving apparatus 11 is connected across the vertical deflecting plates 24 and 25. As the oscillograph per se forms no part of the present invention it will not be further described herein.

The control wave generating apparatus 13 comprises a square wave generator 27 of any suitable form connected, preferably through a phase shifter 28, to the input circuit of an electron discharge device or gate device 29 in the anode-cathode circuit of which is connected a condenser 30.

Across the condenser 30 is connected an electron discharge device 31 arranged as a constant current pentode. The pentode 31 is connected through a potentiometer 32 to the input circuit of a polarity reversing electron discharge device 33 the output of which is connected through a potentiometer 34 to the input circuit of an amplifier electron discharge device 35 having a resistor 36 in its anode-cathode circuit.

The cathode resistor 36 of the control wave generating apparatus 13 is connected across the anode-cathode circuit of one or more of the intermediate frequency amplifier stages, as 19, of the receiving apparatus 11. The condenser 30 of apparatus 13 is connected across the horizontal deflecting plates 22 and 23 of oscillographic apparatus 12. The square wave generator 27 is preferably interconnected, as indicated by the dotted leads 37, with the pulse transmitter 14 for synchronizing of the two generators.

In operation of the system of Fig. 1, square waves are produced by generator 27 synchronously, or in a suitable phase relation as will be later explained, with the initiation of the direct short-period pulses projected by transmitter 14 to the targets in the predetermined range. The square waves from generator 27 are impressed upon the input circuit of gate discharge device 29 whereby condenser 30 is charged through the device 29 during the positive half cycle of the square wave. When the control electrode of discharge device 29 is swung negative at the negative half cycle of the square wave the latter discharge device becomes nonconducting thereby isolating condenser 30 from the charging source and the latter condenser begins to discharge through discharge device 31 which is arranged as a constant current pentode. Because of the constant current characteristic of pentode 31 the voltage across condenser 30 decays linearly with time and thus a closely linear sawtooth wave is produced. This sawtooth wave is impressed upon the horizontal deflecting plates 22 and 23 of oscillograph 12 to produce a sweep trace on the screen 26 thereof at each period of reception of the echo signals emanating from the targets in the predetermined range following upon each initiation of a direct pulse from transmitter 10.

The sawtooth wave from condenser 30 after phase reversal in electron discharge device 33 is also impressed upon the input circuit of amplifier 35 and a sawtooth wave is produced across resistor 36 of suitable polarity and intensity for the receiver gain control, which is effected in a manner to be presently explained.

The echo signals or signals emanating from the targets upon impingement thereon of the direct pulses projected from transmitter 10 are impressed during each sweep trace period upon the receiver amplifier and first detector stage 16 the output of which is supplied to the intermediate frequency amplifier stages 18. The gain of the receiver 11 is a function of the anode and screen potential of the electron discharge devices, as 19, of the intermediate frequency amplifier. This potential, for at least the first two intermediate frequency stages preferably, is supplied by the voltage drop across cathode resistor 36 associated with the cathode-loaded amplifier discharge device 35 of control wave generating apparatus 13.

In operating a range determining system of the foregoing type as commonly employed heretofore, a discharge device such as amplifier 35 of generating apparatus 13 has been opened wide, and made fully conductive by a square wave immediately after the initiation of the direct pulse from the transmitter 10. Consequently the anode and screen potential supplied to the intermediate frequency amplifier 18 has been maintained constant in accordance with the square wave during each reception period, with the resulting difficulties, hereinabove explained, in interpreting the indications or deflections produced in the sweep trace of the oscillograph.

In accordance with the present invention, however, the controlling potential applied to the intermediate frequency amplifier 18 is the potential represented by the sawtooth wave developed across cathode resistor 36 of the amplifier 35, and accordingly the sensitivity of the receiver apparatus 11 is increased with time, during each period of reception of the pulses from the targets, to compensate for the decrease of average intensity of the received pulses with distance of the targets from the receiver. Potentiometer 32 controls the amount and slope of the sawtooth control wave, and potentiometer 34 controls the D.-C. bias upon which the sawtooth is superimposed.

Figs. 2 and 3 illustrate the indications or deflections in sweep traces formed on the oscillograph screen 26 corresponding to received pulses emanating from the above-mentioned targets. In forming the sweep trace illustrated in Fig. 2 the gain of the receiver was maintained constant during the scanning periods by the use of the square wave, heretofore employed as hereinabove described, for controlling the anode and screen potential of the receiver intermediate frequency amplifier. The receiver gain was so adjusted that the deflections corresponding to objects or targets eight to ten miles distant from the receiver were of suitable amplitude for detailed examination. However, as may be readily observed from the sweep trace of Fig. 2, the received reflections from nearby objects or targets were then so strong that the deflections corresponding thereto were entirely off-scale thus causing most of the detail for this nearby portion of the range to be blocked out.

As illustrated in Fig. 3, the sawtooth gain control arrangement in accordance with the present invention was then immediately applied to the receiver which was arranged to scan the same objects or targets as in the case of Fig. 2. The gain control was so adjusted that nearby received reflections were of approximately the same strength as the distant reflections. As clearly shown in the sweep trace of Fig. 3, the improvement in detail in the deflections corresponding to nearby objects is very marked and, in general, the deflections across the entire sweep trace are seen to be readily observable and usable for the determination of range and of other characteristics of the targets.

In certain cases in operation of the range determining system in accordance with my present invention, it may be desirable so to shift in phase, by the shifter 28, the square wave impressed upon gate discharge device 29 that, because of the corresponding phase shift of the sawtooth wave from resistor 36, the receiver 11 does not start to initiate the deflections in the sweep trace until after a definite time delay following the initiation of the main or direct pulse from transmitter 10. Such time delay in initiation of the sweep trace deflections is desirable if deflections corresponding to close-by objects are to be observed since otherwise the transients introduced by the main pulse from transmitter 10 may tend to paralyze the receiver for an appreciable time at the beginning of the reception periods.

In a practical range determining system constructed and operated as described in connection with Fig. 1, the maximum range sweep was approximately ten miles. The elapsed time, after the initiation of a direct pulse, before the arrival of the pulse reflected or emanating from a target is about eleven microseconds per mile of distance from the range apparatus to the target. Therefore, in utilizing the present invention in the practical system above-mentioned the receiver 11 was brought uniformly from a condition of low sensitivity to one of high sensitivity in a succession of time periods of 110 microseconds each, or about one ten-thousandth of a second. It will be understood that the present invention is in no sense limited to the range above cited in connection with Figs. 2 and 3.

With the apparatus illustrated the range from which echoes may be received may be varied by variation of the duration of the positive portion of the square wave generated by generator 27. Since commonly a multivibrator is used for such square wave generators this variation may be effected by variation of one or more circuit elements thereof in the manners now well known in the art. Also the time of initiation and termination of the period of reception may be varied together by varying the phase shifter 28.

Since in the above illustrated example the reception occurs only over a period of approximately one ten-thousandth of a second the frequency of the radiated pulses must be less than ten-thousandth per second and commonly is between sixty and two thousand pulses per second but may be as low as twenty per second. If the frequency of the pulses is too low as below about twenty per second the indications of the low frequency become apparent and objectionable on the screen i. e. the persistence of the screen and of vision is insufficient to cause the indications to appear continuous as radar indications are known to appear.

Referring to Fig. 4, the range determining system illustrated therein is similar to that illustrated in Fig. 1 except that in Fig. 4 the sawtooth wave for receiver gain control is provided by somewhat different means. In the system of Fig. 4, square wave generator 27 is connected to a clipper discharge device 38 connected across the condenser 39 of a capacitor-resistor charging circuit 40 comprising the latter condenser 39 and in series therewith a resistor 41 preferably connected to the source (not shown) of anode potential of discharge device 38. A separate source of potential for the capacitor-resistor circuit 40 may be provided if desired. Condenser 39 is connected across the input circuit of the amplifier 35 which includes the resistor 36 in its anode-cathode circuit as in Fig. 1.

Although the sawtooth wave employed for the gain control of receiver 11 has been described herein in connection with Fig. 1 as having a closely linear characteristic, a gain control wave may be provided, as will be explained hereinafter in connection with Fig. 4, which is in general of sawtooth shape but having a curved characteristic instead of linear, in order, for example, to match the receiver response characteristic, or to correct a possibly undesirable response characteristic.

In Fig. 4 the clipper discharge device 38, during the negative half cycle of the square wave, permits the capacitor 39 to be charged, through resistor 41, along an exponential curve. The constants of the capacitor-resistor circuit 40 and the charging voltage thereacross may be so chosen that a sawtooth wave is produced in which the numeral $c$ designates, for the time interval corresponding to the negative half cycle of the square wave, a portion of an exponential curve which over this initial portion, $C'$ is fairly linear. Therefore the corresponding sawtooth wave designated by the character $g$, developed across resistor 36 for the gain control of receiver 11 is also fairly linear. The deflections on the sweep trace oscillograph corresponding to the targets in a given range will then be controlled as explained in connection with Fig. 1.

However, the constants of the capacitor-resistor circuit 40 may be so chosen, and the voltage thereacross so adjusted if required, that a sawtooth wave is produced in which the portion $C''$ represents the initial portion of an exponential curve in which this initial portion $C'$ is curved instead of linear, and correspondingly the sawtooth wave, $g'$, developed across resistor 36 is also curved. It will be understood that different degrees of curvature of the curve portion $C'$ may be produced to suit varying conditions.

Referring to Fig. 5, in the system illustrated therein the cathode-loaded amplifier 35 having the resistor 36 in its anode-cathode circuit is utilized as in the systems of Figs. 1 and 4 in supplying the gain control potential for the receiver 11. Since in many cases a sawtooth wave which may be synchronized with the direct or main pulse from transmitter 10 is required for deflecting the cathode ray spot in an oscillographic apparatus and is therefore already available, it is often possible to utilize such a sawtooth wave in a range determining system in accordance with my present invention.

Thus in Fig. 5 such a usual sawtooth wave source, designated by the rectangle 42, is assumed to be available for forming the sweep trace on the oscillograph provided for indicating ranges of targets as described hereinabove in connection with Figs. 1 to 4. But it is also possible to utilize this sawtooth wave from generator 42 either directly or, if desired, after reversing its polarity in a suitable amplifying stage (not shown), in providing the gain control for the receiver 11. For the latter purpose the sawtooth generator 42 is connected through slope control potentiometer 43 and D.-C. bias control potentiometer 44 to the input circuit of the above-mentioned cathode-loaded amplifier 35.

Instead of superimposing the sawtooth wave from generator 42 upon a D.-C. voltage as in Fig. 5, the sawtooth wave may be superposed upon a square wave if complete cutoff of the receiver 11 is required during the off periods, or periods between received pulse periods. In the latter case potentiometer 44 may be connected across a suitable generator of square waves, as designated by the rectangle 45, so arranged that the sweep periods of the sawtooth wave are synchronized with the positive half cycles of the square wave and the off periods of the sawtooth wave with the negative half cycles.

My invention has been described herein in particular embodiments for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States is:

1. The combination, in a pulse echo system, means to transmit recurrent electromagnetic pulses, a square wave generator synchronous therewith, a condenser having a discharge path, an electron discharge device connected between said generator and said condenser to produce recurrent charging of said condenser during pulses of one polarity of said square wave, said condenser discharging through said path during pulses of opposite polarity of said square wave, means to receive pulses corresponding to said transmitted pulses from remote objects during the intervals between said transmitted pulses, means to increase the sensitivity of said receiving means during the intervals between said transmitted pulses in response to variation in voltage on said condenser, and a phase shifter between said square wave generator and said electron discharge device to delay said increase in sensitivity with respect to said transmitted electromagnetic pulses.

2. The combination, in a pulse echo system, means to transmit recurrent electromagnetic pulses, a square wave generator synchronous therewith, a condenser having a discharge path, an electron discharge device connected between said generator and said condenser to produce recurrent charging of said condenser during pulses of one polarity of said square wave, said condenser discharging through said path during pulses of opposite polarity of said square wave, means to receive pulses corresponding to said transmitted pulses from remote objects during the intervals between said transmitted pulses, and means to increase the sensitivity of said receiving means with time between said radiated pulses, said means comprising a cathode follower amplifier including an electron discharge device having an anode, a cathode, a control electrode, and a resistance in circuit between said cathode and both said control electrode and anode, means to supply the voltage on said condenser between said control electrode and cathode, and means to vary the sensitivity of said receiver in accord with the voltage on said resistance.

3. In combination, means to transmit recurrent radio pulses, means to receive pulses corresponding thereto from remote objects during the intervals therebetween, a cathode ray device having a viewing screen, means to deflect the ray of said device across said screen during said intervals and to influence said ray in accord with said received pulses thereby to produce indications of said objects on said screen, means to produce a square wave and a sawtooth wave both synchronous with said transmitted pulses, and means to combine said waves in aiding relation and to supply the resultant to said receiver to control the sensitivity thereof, said waves being poled to render said receiver insensitive during the transmitted pulses and to increase its sensitivity in accord with the sum of said waves during the interval between said transmitted pulses.

4. Radio transmitting and receiving apparatus comprising means for radiating periodic pulses into space, means for deriving signals from radio pulses reflected from irradiated objects, variable gain amplifier means for amplifying said signals, and gain control means comprising means for generating a substantially rectangular periodic wave, electrical conductors between said last means and said radio transmitting apparatus, means to transmit energy over said electrical conductors to maintain said rectangular periodic wave synchronized with said radiated pulses, wave shaping means deforming said rectangular wave for increasing the gain of said amplifier means as a function of time, and means controlled by said rectangular wave for limiting the duration of the deformed wave to a desired portion of the period between said radiated pulses.

5. Radio transmitting and receiving apparatus comprising means for radiating periodic pulses into space, means for deriving signals from radio pulses reflected from irradiated objects, variable gain amplifier means for amplifying said signals, and gain control means comprising means for generating a substantially rectangular periodic wave, electrical conductors between said last means and said transmitting apparatus, means to transmit energy over said electrical conductors to maintain said rectangular periodic wave synchronized with said radiated pulses, wave shaping means deforming said rectangular wave for increasing the gain of said amplifier means as a function of time, and means controlled by said rectangular wave for limiting the duration of the deformed wave to that of said rectangular wave.

6. In apparatus compensating for range attenuation of pulses of radio energy delivered to a radio receiver during a predetermined receiving cycle, means progressively increasing the gain of said radio receiver from zero to a maximum during only a portion of said cycle, a square wave generator, means controlled by the square wave generated by said generator for terminating said portion in said cycle, and means for varying the rate of increase of said gain within said portion of said cycle.

7. Radio transmitting and receiving apparatus comprising means for radiating periodic pulses into space, means for deriving signals from radio pulses reflected from irradiated objects, variable gain amplifier means for amplifying said signals, and gain control means, said gain control means comprising a circuit in which a substantially rectangular wave appears, an electrical channel between said transmitting apparatus and said circuit, said channel having means to transmit electrical energy through said channel to maintain a desired time relation between said rectangular wave and said radiated pulses, wave shaping means deforming said rectangular wave for increasing the gain of said amplifier means as a function of time, and means controlled by said rectangular wave for limiting the duration of the deformed wave to a desired portion of the period between said radiated pulses.

8. Radio transmitting and receiving apparatus comprising means for radiating periodic radio pulses into space, means for deriving signals from radio pulses reflected from irradiated objects, variable gain amplifier means for amplifying said signals, and gain control means, said gain control means comprising means for generating a rectangular wave having a desired time relation with said periodic pulses and having an electrical channel extending between said transmitting means and said generating means over which electrical energy is transmitted to maintain said desired time relation, means responsive to said rectangular wave to increase the gain of said amplifier progressively over a predetermined period after each of said radiated pulses while said reflected pulses are received and means to control the phase relation between said rectangular wave and said periodic pulses to cause said increase in gain to be initiated at a desired time after each radiated pulse.

9. Radio transmitting and receiving apparatus comprising means for radiating periodic radio pulses into space, means for deriving signals from radio pulses reflected from irradiated objects, a cathode ray device having a viewing screen, variable gain amplifier means for amplifying said signals and applying said signals to said cathode ray device to modulate the ray thereof, means to deflect the ray of said device across said screen at a rate to indicate equal modulations of said ray with equal definition, a circuit having therein a substantially rectangular wave, an electrical channel between said transmitting apparatus and said circuit having therein means to control said rectangular wave in its time relation with said radiated pulses, wave shaping means deforming said rectangular wave for increasing the gain of said amplifier means as a function of time, and means controlled by said rectangular wave to limit the duration of the deformed wave to a desired portion of the period between said radiated pulses.

FRANKLIN G. PATTERSON.

REFERENCES CITED

The following references are of record in the file of this patent:

UNITED STATES PATENTS

| Number | Name | Date |
|---|---|---|
| 2,167,492 | Sproule | July 25, 1939 |
| 2,241,256 | Gould | May 6, 1941 |
| 2,411,572 | Hershberger | Nov. 26, 1946 |
| 2,422,334 | Bedford | June 17, 1947 |
| 2,427,523 | Dolberg | Sept. 16, 1947 |
| 2,432,180 | Tourshou | Dec. 9, 1947 |
| 2,444,721 | Blaisdell | July 6, 1948 |
| 2,455,673 | Hansell | Dec. 7, 1948 |
| 2,456,952 | Kluender | Dec. 21, 1948 |
| 2,498,381 | Smith | Feb. 21, 1950 |
| 2,554,515 | Young et al. | May 29, 1951 |

FOREIGN PATENTS

| Number | Country | Date |
|---|---|---|
| 853,994 | France | Apr. 12, 1940 |

(Corresponding U. S. Elie et al., 2,433,838, Jan. 6, 1948)